United States Patent
Schürmann et al.

(10) Patent No.: US 10,429,549 B2
(45) Date of Patent: Oct. 1, 2019

(54) OPTICAL ELEMENT COMPRISING A REFLECTIVE COATING

(71) Applicants: Fraunhofer-Gesellschaft zur Förderung der angewandten Forschung e.V., Munich (DE); Friedrich-Schiller-Universität Jena, Jena (DE)

(72) Inventors: Mark Schürmann, Jena (DE); Stefan Schwinde, Jena (DE); Norbert Kaiser, Jena (DE)

(73) Assignees: Fraunhofer-Gesellschaft zur Förderung der angewandten Forschung e.V., München (DE); Friedrich-Schiller-Universität Jena, Jena (DE)

( * ) Notice: Subject to any disclaimer, the term of this patent is extended or adjusted under 35 U.S.C. 154(b) by 0 days.

(21) Appl. No.: 15/320,721

(22) PCT Filed: Jun. 12, 2015

(86) PCT No.: PCT/EP2015/063208
§ 371 (c)(1),
(2) Date: Dec. 20, 2016

(87) PCT Pub. No.: WO2015/193195
PCT Pub. Date: Dec. 23, 2015

(65) Prior Publication Data
US 2017/0139085 A1   May 18, 2017

(30) Foreign Application Priority Data

Jun. 20, 2014   (DE) .................. 10 2014 108 679

(51) Int. Cl.
G02B 1/14 (2015.01)
G02B 5/08 (2006.01)
G02B 27/14 (2006.01)

(52) U.S. Cl.
CPC .............. G02B 1/14 (2015.01); G02B 5/0808 (2013.01); G02B 5/0858 (2013.01); G02B 27/142 (2013.01)

(58) Field of Classification Search
CPC .... G02B 27/0006; G02B 5/0808; G02B 1/18; G02B 7/182; G02B 1/105; G02B 5/08;
(Continued)

(56) References Cited

U.S. PATENT DOCUMENTS 3,687,713 A   8/1972  Adams
4,963,012 A  10/1990  Tracy et al.
(Continued)

FOREIGN PATENT DOCUMENTS

DE   4104735 A1   2/1992
DE   4236637 A1   5/1993
(Continued)

OTHER PUBLICATIONS

Thomas, N. et al., "UV-Shifted Durable Silver Coating for Astronomical Mirrors," downloaded from: http://proceedings.spiedigitallibrary.org/ on Nov. 19, 2013, 12 pages.

*Primary Examiner* — Jade R Chwasz
(74) *Attorney, Agent, or Firm* — Slater Matsil, LLP

(57) ABSTRACT

An optical element including a reflective coating is disclosed. In an embodiment the reflective coating includes an adhesion-promoting layer, an at least partially reflective silver layer disposed on the adhesion-promoting layer and a protective layer system disposed on the silver layer, wherein the protective layer system includes a plurality of dielectric layers, wherein the dielectric layers include at least one first
(Continued)

layer and at least one second layer, wherein the first layer and the second layer have a different resistance to at least two different contamination substances, wherein the dielectric layers have a thickness of not more than 30 nm, and wherein a number of the dielectric layers amounts to at least five.

11 Claims, 2 Drawing Sheets

(58) Field of Classification Search
CPC .... G02B 7/183; G02B 5/0875; G02B 27/142; G02B 5/0841; G02B 5/0858
USPC ........ 359/507, 513, 514, 839, 871, 883, 884
See application file for complete search history.

(56) References Cited

U.S. PATENT DOCUMENTS

| | | |
|---|---|---|
| 5,019,458 A | 5/1991 | Elgat et al. |
| 5,216,551 A | 6/1993 | Fujii |
| 5,344,718 A | 9/1994 | Hartig et al. |
| 5,361,172 A | 11/1994 | Schissel et al. |
| 5,377,045 A | 12/1994 | Wolfe et al. |
| 5,514,476 A | 5/1996 | Hartig et al. |
| 5,521,765 A | 5/1996 | Wolfe |
| 5,563,734 A | 10/1996 | Wolfe et al. |
| 5,583,704 A | 12/1996 | Fujii |
| 5,699,188 A | 12/1997 | Gilbert et al. |
| 6,078,425 A | 6/2000 | Wolfe et al. |
| 6,830,817 B2 * | 12/2004 | Stachowiak ............ C03C 17/36 428/426 |
| 2002/0154407 A1 | 10/2002 | Frazier |
| 2007/0036987 A1 * | 2/2007 | Landa .................... C03C 3/087 428/432 |
| 2012/0128954 A1 | 5/2012 | Ballou et al. |

FOREIGN PATENT DOCUMENTS

| | | |
|---|---|---|
| DE | 10005121 A1 | 10/2000 |
| DE | 102005000911 A1 | 7/2006 |
| DE | 102006011973 A1 | 9/2007 |
| DE | 102011012044 A1 | 8/2012 |
| DE | 102009030810 A1 | 2/2014 |
| EP | 2270392 A1 | 1/2011 |
| EP | 2573597 A1 | 3/2013 |
| GB | 2281411 A | 3/1995 |
| WO | 2006053705 A1 | 5/2006 |
| WO | WO 2006053705 A1 * | 5/2006 ............ G02B 1/111 |

* cited by examiner

OPTICAL ELEMENT COMPRISING A REFLECTIVE COATING

This patent application is a national phase filing under section 371 of PCT/EP2015/063208, filed Jun. 12, 2015, which claims the priority of German patent application 10 2014 108 679.1, filed Jun. 20, 2014, each of which is incorporated herein by reference in its entirety.

TECHNICAL FIELD

The invention relates to an optical element, in particular a curved optical element, to which a reflective coating is applied.

BACKGROUND

Numerous applications for precision-optics components require a mirror layer which is highly reflective in the widest possible spectral range. Metals such as, for example, gold, aluminum or silver are therefore often used as a reflective coating. Of the metals, silver has the highest reflectivity from the visible to the infrared spectral range. However, silver is very susceptible to corrosion. In order to avoid the corrosion of a reflective metal layer, in particular a silver layer, a protective layer can be applied to the metal layer.

It has been found, however, that even reflective silver layers provided with a protective layer often do not have an adequate long-term stability. If, for example, silver mirrors provided with a protective layer are exposed for a relatively long time to environmental conditions with very high air humidity, or if condensation of such mirrors even occurs, liquid, in particular with dissolved corrosive substances, can pass at these locations through the protective layer to the corrosion-sensitive silver layer. A corrosion process is initiated at these locations and then propagates proceeding from this origin through the silver layer.

SUMMARY OF THE INVENTION

Embodiments of the invention provide an improved optical element comprising a reflective coating which is distinguished by an improved resistance to contamination substances from the surroundings.

According to at least one embodiment, the optical element has a reflective coating, which is applied for example to the surface of a substrate or to the surface of a, preferably polished, layer applied to a substrate.

According to a preferred embodiment, the optical element has a curved surface, the reflective coating being arranged on the curved surface. By way of example, the curved surface can be the surface of a substrate or the surface of a, preferably polished, layer applied to a substrate. The optical element can be provided for applications in precision optics, for example. The optical element can be provided in particular for applications in astronomy and/or for applications in space, for example for Earth observation.

The reflective coating advantageously contains an adhesion-promoting layer, which is applied for example as a first layer to a substrate. During the production of the reflective coating, the adhesion-promoting layer can be applied to the surface of the optical element, for example, in a first step by a PVD (Physical Vapor Deposition) process, such as, for example, thermal evaporation, electron beam evaporation, plasma-enhanced evaporation, magnetron sputtering or ion beam sputtering. Alternatively, the adhesion-promoting layer can be applied by using a CVD (Chemical Vapor Deposition) process or an ALD (Atomic Layer Deposition) process. The adhesion-promoting layer has the function in particular of improving the adhesion of a reflective metal layer arranged thereabove. Furthermore, the adhesion-promoting layer can simultaneously have the function of a diffusion barrier layer. In its property as a diffusion barrier layer, the adhesion-promoting layer can reduce in particular the diffusion between constituent parts of a substrate of the optical element and a metal layer following the adhesion-promoting layer, and vice versa.

The adhesion-promoting layer can be an individual layer or a sequence of a plurality of layers. The adhesion-promoting layer is advantageously formed from a material which ensures good adhesion between the metal layer following it and the substrate. Suitable materials for the adhesion-promoting layer are, for example, metals such as Cr, Ti, Cu, Ru, Mo, W, semiconductors such as Si or SiC, or dielectric layers such as $SiO_2$, $Si_3N_4$, $Al_2O_3$, AlN, $ZrO_2$, ZrN, $HfO_2$, HfN, $Ta_2O_5$, TaN, $Nb_2O_5$, NbN, $Y_2O_3$, YN, or mixtures of these materials. The adhesion-promoting layer preferably has a thickness of between 5 nm and 1000 nm, particularly preferably between 10 nm and 100 nm.

An at least partially reflective metal layer follows the adhesion-promoting layer in the reflective coating. Depending on its layer thickness, the at least partially reflective metal layer can be a highly reflective metal layer for forming a reflector or alternatively an only partially reflective metal layer, for example for forming a beam splitter. The metal layer of the reflective coating preferably comprises silver, gold or aluminum. Particular preference is given to silver, since silver has a particularly high reflection. Although silver per se is susceptible to corrosion, the corrosion in the case of the optical element described herein is counteracted particularly effectively by the protective layer system.

In the reflective coating, the metal layer is followed by a protective layer system, which serves in particular to protect the metal layer from environmental influences. The protective layer system contains a plurality of dielectric layers, the dielectric layers preferably comprising at least one first layer and at least one second layer, the first layer and the second layer advantageously having a different resistance to at least two different contamination substances. By way of example, the at least one first layer can be distinguished by a high resistance to a first contamination substance and the at least one second layer can be distinguished by a high resistance to a second contamination substance which differs from the first contamination substance.

The contamination substances can be in particular those substances which can arise under the environmental conditions of the optical element, for example during storage, transportation and/or operation. In the case of an optical element provided for use in space, these can be the terrestrial environmental conditions which can arise, for example, during the production, the storage or the transportation of the optical element. By way of example, the contamination substances can be liquids with which the optical element can come into contact, where salts from the surroundings may be dissolved in the liquids, for example. The contamination substances may be in particular hygroscopic particles which contain salts. Even at room temperature and with an air humidity of less than 80%, these hygroscopic particles can lead to the formation of defects.

In the case of the protective layer system described herein, the fact that the first layer and the second layer have a different resistance to two different contamination substances means that a higher resistance to such contamination substances is advantageously achieved compared to that which could be achieved by an individual layer consisting of the first material or the second material.

The protective layer system contains a plurality of dielectric layers and preferably consists exclusively of dielectric layers. It is advantageous if the dielectric layers of the protective layer system are very thin layers. The thickness of the dielectric layers of the protective layer system is preferably not more than 30 nm, particularly preferably not more than 20 nm. It has been found in particular that, when thicker dielectric layers are used, greater defects can arise through contamination particles on account of the greater layer stresses which are caused as a result. In layers with a thickness of not more than 30 nm or preferably of not more than 20 nm, the layer stresses are advantageously low compared to significantly thicker layers. When comparatively thin layers are used, it is advantageously possible for more layers to be stacked in the protective layer system than in the case of thicker layers given a predefined overall layer thickness of the protective layer system, this resulting for example from optical requirements such as the transmission or the absorption. This has the advantage that the protective layer system has more interfaces, which can form a barrier to the propagation of particles or defects. The number of the dielectric layers of the protective layer system preferably amounts to at least three, at least five or even at least ten.

It is furthermore advantageous if the thickness of the dielectric layers is at least 1 nm, preferably at least 2 nm. The dielectric layers of the protective layer system can have a thickness, for example, of between 1 nm and 30 nm, preferably between 2 nm and 20 nm.

Suitable materials for the protective layer system are in particular oxide layers, nitride layers or fluoride layers. In particular, the dielectric layers of the protective layer system can contain or consist of at least one of the following materials: $SiO_2$, $Si_3N_4$, $Al_2O_3$, AlN, $ZrO_2$, ZrN, $HfO_2$, HfN, $TiO_2$, TiN, $Ta_2O_5$, TaN, $Nb_2O_5$, NbN, $Y_2O_3$, YN, $MgF_2$, MgO, LiF, $AlF_3$.

It has been found that, in the event of the accumulation of contaminations on an optical element, water molecules can be bound to the contaminations through a hygroscopic action of the contaminations, as a result of which a small droplet is formed on the protective layer system. Components such as ions from the contamination particles may be dissolved in said droplet, such as to form an electrolyte which, without suitable protection, could reach the reflective metal layer and damage it. The contamination substances which are formed in this way can comprise in particular chlorine, sulfur and/or compounds of chlorine or sulfur. Salts such as NaCl or $Na_2S$ in particular can have a damaging effect on reflective metal layers, in particular silver. It is therefore advantageous if the first layer and/or the second layer have a high resistance to the contamination substances chlorine, sulfur and/or compounds of chlorine or sulfur.

According to an advantageous embodiment, the first layer has a greater resistance to chlorine and/or chlorine compounds than the second layer. Furthermore, it is advantageous if the second layer has a greater resistance to sulfur and/or sulfur compounds than the first layer. The terms "first layer" and "second layer" do not refer to the sequence of the layers in the reflective coating, but rather serve merely for distinguishing between the layers which have different resistances to the different contamination substances. In the reflective coating, the first layer can therefore be arranged above the second layer or alternatively the second layer can be arranged above the first layer. Furthermore, the first layer and the second layer can be arranged in multi-layer systems, which each have a plurality of first layers and/or second layers. The protective layer system preferably has at least three layers composed of at least two different dielectric materials which are distinguished by a different resistance to the at least two different contamination substances.

According to an advantageous embodiment, the first layer comprises an aluminum oxide, in particular $Al_2O_3$. It has been found in particular that an aluminum oxide layer has a good resistance to chlorine and/or a chlorine compound, in particular NaCl. An aluminum oxide layer is furthermore distinguished by a high transparency in a wide spectral range, which ranges from the UV range into the IR range.

The second layer preferably comprises a silicon oxide such as, for example, $SiO_2$. It has been found that a silicon oxide layer in particular has a good resistance to sulfur and/or sulfur compounds such as, for example, $Na_2S$.

It is therefore particularly advantageous if the protective layer system has at least one first layer consisting of an aluminum oxide and at least one second layer consisting of a silicon oxide. This can have the effect in particular that the protective layer system has a good resistance to chlorine and/or chlorine compounds and at the same time a good resistance to sulfur and/or sulfur compounds.

A particularly good resistance to the at least two contamination substances can be achieved by virtue of the fact that the layer system contains at least two layer pairs made up in each case of the first layer and the second layer. It is particularly preferable for the protective layer system to even contain at least three, at least four or even at least five layer pairs made up in each case of the first layer and the second layer. The alternating arrangement of a plurality of first layers and second layers in the protective layer system particularly effectively prevents the penetration of contamination substances as far as the reflective metal layer.

In one embodiment of the reflective coating, a further adhesion-promoting layer is arranged between the metal layer and the protective layer system. The further adhesion-promoting layer advantageously comprises a material which ensures good adhesion of the protective layer system on the reflective metal layer. The further adhesion-promoting layer can comprise in particular a metal such as Cr, Ti, Cu, Ru, Mo, W, a semiconductor material such as Si or SiC, a dielectric material such as $SiO_2$, $Si_3N_4$, $Al_2O_3$, AlN, $ZrO_2$, ZrN, $HfO_2$, HfN, $Ta_2O_5$, TaN, $Nb_2O_5$, NbN, $Y_2O_3$, YN, or mixtures of these materials. The thickness of the further adhesion-promoting layer is advantageously between 0.1 nm and 40 nm, preferably between 0.5 nm and 20 nm. In a similar manner to the adhesion-promoting layer arranged between the substrate and the metal layer, the further adhesion-promoting layer can also have the function of a diffusion barrier, in addition to its function as an adhesion-promoting layer. In the case of the further adhesion-promoting layer, the adhesion-promoting layer reduces the diffusion between the reflective metal layer and the protective layer system.

In an advantageous embodiment, the protective layer system has an optical function in addition to its function as a protective layer for the reflective metal layer. The protective layer system can be in particular a reflection-enhancing interference layer system in which the dielectric layers in an alternating manner have a relatively low and a relatively high refractive index. In particular, the protective layer system can contain a sequence of a plurality of dielectric layers, which in an alternating manner have a low refractive index, in particular a refractive index $n1 \leq 1.6$, and a high refractive index, in particular a refractive index $n2 > 1.6$. Through such a reflection-enhancing interference layer system, the reflection of the reflective coating in a predefined spectral range can be increased in particular by a suitable selection of the layer thicknesses, it being possible for these to be determined by simulation programs known per se.

In a further advantageous embodiment, the protective layer system has at least one first layer stack with alternating first layers and second layers and at least one second layer stack with alternating first layers and second layers, wherein the layer stacks have a differing effective refractive index. In this embodiment, the effective refractive index is understood to mean the refractive index averaged over the respective layer stack. The effective refractive index of the layer stack is an approximation for the refractive index of the layer stack if the thickness of the first layers and second layers is small compared to the wavelength used. In this embodiment, each of the layer stacks has approximately the function of an optical layer, the thickness of which corresponds to the thickness of the layer stack and the refractive index of which corresponds to the effective refractive index of the layer stack.

The materials of the first layers in the first layer stack and of the first layers in the second layer stack can differ from one another. Similarly, it is possible for the materials of the second layers in the first layer stack and of the second layers in the second layer stack to differ from one another. Alternatively, however, it is also possible for the same materials to be used for the first layers and/or second layers in the first and the second layer stack. In this embodiment, the first and/or second layers in the layer stacks do not differ in terms of the material, but have different thicknesses in the layer stacks.

In a further advantageous embodiment of the optical element, in the protective layer system, the at least one first layer and the at least one second layer have layer stresses with an opposite sign. In this embodiment, the material of the first layer and of the second layer is advantageously chosen in such a manner that the layers generate layer stresses with opposite signs, such that the layer stresses are reduced or even compensate for one another. By way of example, the protective layer system can have first and second dielectric layers, where the first layers generate tensile stresses and the second layers generate compressive stresses, or vice versa. In addition to its function as protection against contamination substances and if appropriate its optical function, the protective layer system can therefore also have a third function for reducing stresses in the reflective coating.

BRIEF DESCRIPTION OF THE DRAWINGS

The invention will be explained in more detail hereinbelow with reference to two exemplary embodiments in connection with FIGS. 1 and 2.

In the drawing.

DETAILED DESCRIPTION OF ILLUSTRATIVE EMBODIMENTS

Identical component parts or component parts with the same action are provided in each case with the same reference signs in the figures. The component parts shown and the size ratios of the component parts in relation to one another are not to be considered as true to scale.

Figure 1:
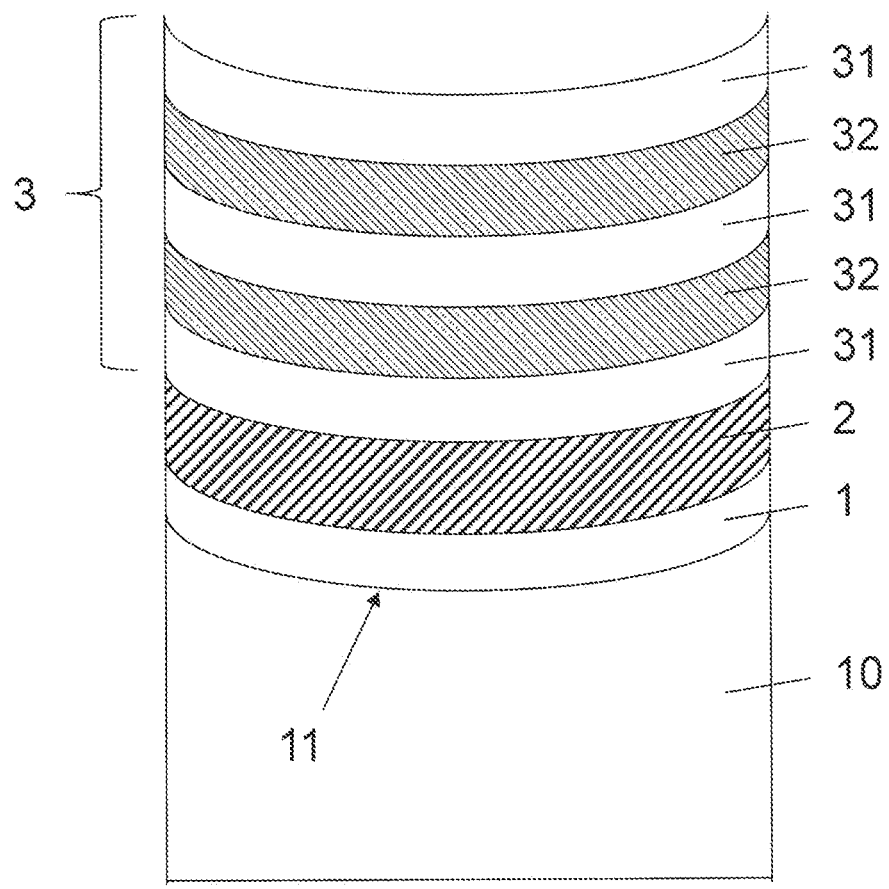
FIG. 1 shows a schematic illustration of a cross section through an optical element according to a first exemplary embodiment.

The optical element according to the first exemplary embodiment which is shown schematically in cross section in FIG. 1 has a substrate 10, which is for example a glass substrate or a polished metal substrate. The substrate 10 preferably has an rms roughness of not more than 2 nm. The optical element may be in particular a curved optical element, in which for example the substrate 10 has a curved surface 11. The optical element can be provided in particular for applications in astronomy. Owing to its high long-term stability, the optical element described herein is particularly suitable for applications in space.

In the exemplary embodiment, a layer system serving as a mirror layer for use in the visual spectral range is applied to the curved surface 11 of the substrate 10. An adhesion-promoting layer 1 comprising, for example, $Al_2O_3$ is applied to the substrate 10 as the first layer. The adhesion-promoting layer 1 and also the further subsequent layers of the layer system have been applied by means of magnetron sputtering in the exemplary embodiment. As an alternative, the layers can be applied by using a PVD process such as, for example, thermal evaporation, electron beam evaporation, plasma-enhanced vapor deposition or ion beam sputtering, a CVD process or an ALD process.

In the exemplary embodiment, a reflective metal layer 2 is applied to the adhesion-promoting layer 1, said metal layer being a silver layer. During the production of the silver layer, the deposition parameters are preferably chosen in such a manner as to produce the smoothest possible silver layer in order to avoid reflection losses through scattering. When the silver layer is deposited by means of magnetron sputtering, it has proven to be expedient, for example, to use argon as the sputtering gas, in which case, for example, a gas flow of 15 sccm, a sputtering power of 500 watts and a target-substrate spacing of more than 100 mm are set.

To protect the silver layer against environmental influences, a protective layer system 3 containing a plurality of dielectric layers 31, 32 has been applied to the silver layer 2. In the exemplary embodiment, the protective layer system 3 is built up from alternating $Al_2O_3$ layers 31 and $SiO_2$ layers 32. In particular, the protective layer system 3, proceeding from the silver layer 2, contains two layer pairs made up in each case of an $Al_2O_3$ layer 31 and an $SiO_2$ layer 32 and also an additional $Al_2O_3$ layer 31 as the last layer.

The $Al_2O_3$ layers 31 can be applied, for example, by a reactive sputtering process, with a metallic aluminum target being used. As the sputtering gas, use can be made of argon with a gas flow of, for example, 35 sccm, with so much oxygen additionally being added as reactive gas that a stoichiometric $Al_2O_3$ layer 31 is deposited. The $Al_2O_3$ layer 31 advantageously has no significant absorption losses in the spectral range of 450 nm to 5000 nm. During the sputtering process, the oxygen partial pressure is advantageously monitored by means of a lambda probe.

The $SiO_2$ layers 32 are likewise applied, for example, by a reactive sputtering process, with a pure silicon target being used. As the sputtering gas, use can be made of argon with a gas flow of, for example, 35 sccm, with so much oxygen additionally being added as reactive gas that a stoichiometric $SiO_2$ layer is deposited. The $SiO_2$ layer 32 advantageously has no significant absorption losses in the visual spectral range. As is the case during the production of the $Al_2O_3$ layer 31, the oxygen partial pressure is advantageously monitored by means of a lambda probe.

In an embodiment of the protective layer system 3, the $Al_2O_3$ layers 31 and the $SiO_2$ layers 32 can each have a thickness of 10 nm. In this case, the overall thickness of the protective layer system 3 is only approximately 50 nm. The comparatively thin alternating first layers 31 and second layers 32 form an effective barrier to contaminations, in spite of their small thicknesses. This is achieved in particular by virtue of the fact that the thin dielectric layers 31, 32 which are resistant to different contaminations are arranged in an alternating manner, and therefore each form a plurality of barriers for different contaminations. Furthermore, layer stresses which would otherwise promote the propagation of defects are reduced by the small thicknesses of the first layers 31 and second layers 32.

As an alternative to the exemplary embodiment described here, it would also be possible to use larger layer thicknesses of approximately 120 nm, in order, for example, to achieve an increase in the reflection in a specific spectral range through optical interference effects. It is possible, for example, to achieve reflection values of more than 95% with the layer system produced in this way in the entire spectral range from 450 nm to 5000 nm.

The reflective coating is distinguished in particular by a good long-term stability. In the case of the reflective coating produced in the manner described here, after a climatic test lasting several days at a temperature of 49° C. and a relative air humidity of 95%, no layer defects occurred and the optical properties of the reflective coating did not change.

Furthermore, the resistance of the reflective coating to substances which can arise in the case of terrestrial environmental conditions was tested. Given contamination of the reflective coating with NaCl and $Na_2S$, damage to the reflective silver layer 2 was determined neither in the regions with contamination by NaCl nor in the regions with contamination by $Na_2S$.

In contrast thereto, a comparative test carried out on a silver layer with an individual $SiO_2$ protective layer showed, after contamination with NaCl and $Na_2S$, damage to the silver in the regions in which contamination with NaCl was present. Furthermore, in the case of a comparative test carried out on a silver layer with an individual $Al_2O_3$ protective layer, it was determined that, after contamination with NaCl and $Na_2S$, there was damage to the silver in the regions in which contamination with $Na_2S$ was present.

The protective layer system 3 described here, which has a sequence of alternating $Al_2O_3$ layers 31 and $SiO_2$ layers 32, simultaneously achieves protection of the silver layer 2 against sulfur-containing contaminations and chlorine-containing contaminations. It is advantageous in particular that the layer system has at least two layer pairs made up of the dielectric layers 31, 32 resistant to the different contaminations, since this has the effect that a multiple barrier is formed against penetration as far as the silver layer 2 for each of the contaminations.

Furthermore, it is advantageous that the alternating dielectric layers 31, 32 have in an alternating manner a high refractive index and a low refractive index. For instance, the refractive index of the $Al_2O_3$ layers 31 in the visible spectral range is approximately 1.7. The refractive index of the $SiO_2$ layers 32 is approximately 1.46 in the visible spectral range. In addition to its protective function, the protective layer system 3 can therefore form an optical interference layer system in order, for example, to increase the reflection of the reflective coating in a specific spectral range. To achieve a reflection maximum given a predefined wavelength, suitable layer thicknesses for the dielectric layers 31, 32 can be determined by simulated calculations.

Figure 2:
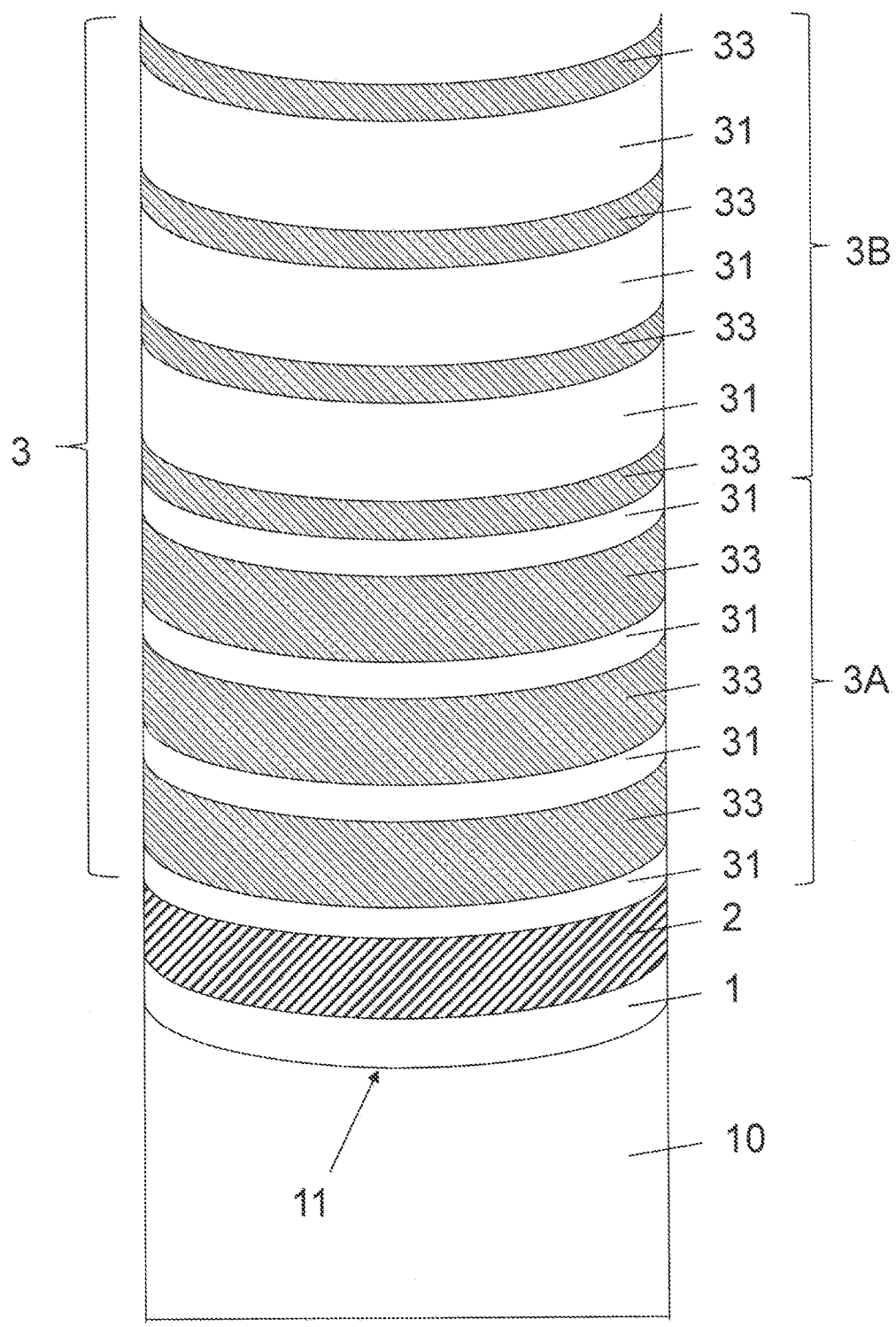
FIG. 2 shows a schematic illustration of a cross section through an optical element according to a second exemplary embodiment.

The second exemplary embodiment of an optical element as shown in FIG. 2 has, like the first exemplary embodiment, a substrate 10 with a curved surface 11, a adhesion-promoting layer 1 consisting of $Al_2O_3$ applied thereto and a following reflective metal layer 2 consisting of silver. The properties and the method of production of these layers correspond to the first exemplary embodiment.

The second exemplary embodiment differs from the first exemplary embodiment in the design of the protective layer system 3. As is shown in FIG. 2, the protective layer system 3 has a sequence of alternating layers 31, 33, these involving $Al_2O_3$ layers 31 and $Si_3N_4$ layers 33. The protective layer system 3 contains a first layer stack 3A, which is formed by three layer pairs made up in each case of an $Al_2O_3$ layer 31 and a $Si_3N_4$ layer 33 and also a final $Al_2O_3$ layer 31. In the first layer stack 3A, the $Al_2O_3$ layers 31 each have a thickness of 5 nm and the $Si_3N_4$ layers 33 each have a thickness of 20 nm.

Furthermore, the protective layer system 3 contains a second layer stack 3B, which has three layer pairs made up in each case of a $Si_3N_4$ layer 33 and an $Al_2O_3$ layer 31 and also a final $Si_3N_4$ layer 33. In the second layer stack 3B, the $Si_3N_4$ layers 33 each have a thickness of 5 nm and the $Al_2O_3$ layers 31 each have a thickness of 20 nm.

In total, the protective layer system 3 contains 14 alternating dielectric layers 31, 33, with a multiplicity of barriers to different contaminations being formed, as in the previous exemplary embodiment, on account of the multiplicity of the layer pairs.

Furthermore, an additional optical function is achieved by the different layer thicknesses of the individual layers 31, 33 in the layer stacks 3A, 3B. Since the layer thicknesses of the individual layers 31, 33 in both layer stacks 3A, 3B in each case amount to not more than 20 nm, they are small compared to wavelengths of visible light. Both layer stacks 3A, 3B can therefore be described approximately by an effective refractive index given by a refractive index of the individual layers which is averaged over the respective layer stacks 3A, 3B. This averaged refractive index is smaller in the first layer stack 3A, in which the $Si_3N_4$ layers 33 have a greater thickness than the $Al_2O_3$ layers 31, than in the second layer stack 3B, in which the $Si_3N_4$ layers 33 have a smaller thickness than the $Al_2O_3$ layers 31. Since the $Al_2O_3$ layers 31 have a greater refractive index than the $Si_3N_4$ layers, the effective refractive index of the second layer stack 3B is greater than the effective refractive index of the first layer stack 3A.

The protective layer system 3 therefore forms an optical interference layer system which is formed by the first layer stack 3A with a relatively low effective refractive index and a second layer stack 3B with a relatively high effective refractive index. The multiplicity of the layers 31, 33 and the different layer thicknesses in the layer stacks 3A, 3B therefore allow for a further improved setting of the optical properties of the entire protective layer system 3 compared to a protective layer system with fewer individual layers.

The invention is not limited by the description with reference to the exemplary embodiments. Instead, the invention encompasses any new feature and also any combination of features, this including, in particular, any combination of features in the patent claims, even if this feature or this combination itself is not explicitly specified in the patent claims or exemplary embodiments.

The invention claimed is:

1. An optical element comprising a reflective coating, the reflective coating comprising:
   a adhesion-promoting layer;
   an at least partially reflective metal layer disposed on the adhesion-promoting layer; and a protective layer system disposed on the reflective metal layer, the protective layer system containing a plurality of dielectric layers, wherein the dielectric layers comprise at least one first layer and at least one second layer, wherein the first layer and the second layer have a different resistance to at least two different contamination substances, wherein the dielectric layers have a thickness of not more than 20 nm, wherein a number of the dielectric layers amounts to at least five, wherein the first layer is an aluminum oxide layer, wherein the second layer is a silicon oxide layer, and wherein the protective layer system contains at least two layer pairs made up in each case of the first layer and the second layer.

2. The optical element according to claim 1, wherein the contamination substances comprise chlorine, sulfur and/or compounds of chlorine or sulfur.

3. The optical element according to claim 1, wherein the first layer has a greater resistance to chlorine and/or chlorine compounds than the second layer.

4. The optical element according to claim 1, wherein the second layer has a greater resistance to sulfur and/or sulfur compounds than the first layer.

5. The optical element according to claim 1, wherein the protective layer system contains at least two layer pairs made up in each case of the first layer and the second layer.

6. The optical element according to claim 1, wherein the protective layer system contains at least three layer pairs made up in each case of the first layer and the second layer.

7. The optical element according to claim 1, wherein the protective layer system has at least one first layer stack with alternating first layers and second layers and at least one second layer stack with alternating first layers and second layers, and wherein the first and second layer stacks have a differing effective refractive index.

8. The optical element according to claim 1, wherein, in the protective layer system, the at least one first layer and the at least one second layer have layer stresses with an opposite sign.

9. The optical element according to claim 1, wherein the reflective coating is disposed on the optical element, the optical element having a substrate with a curved surface.

10. The optical element according to claim 1, wherein the reflective metal layer is a silver layer.

11. An optical element comprising a reflective coating, the reflective coating comprising:

a adhesion-promoting layer;

an at least partially reflective metal layer disposed on the adhesion-promoting layer; and a protective layer system disposed on the reflective metal layer, the protective layer system containing a plurality of dielectric layers, wherein the dielectric layers comprise at least one first layer and at least one second layer, wherein the first layer and the second layer have a different resistance to at least two different contamination substances, wherein the dielectric layers have a thickness of not more than 20 nm, wherein a number of the dielectric layers amounts to at least five, wherein the first layer is an aluminum oxide layer, wherein the second layer is a silicon oxide layer, wherein the protective layer system contains at least two layer pairs made up in each case of the first layer and the second layer, wherein the protective layer system has at least one first layer stack with alternating first layers and second layers and at least one second layer stack with alternating first layers and second layers, and wherein the first and second layer stacks have a differing effective refractive index.

* * * * *